United States Patent
Bernhart (10) Patent No.: US 7,072,640 B2
(45) Date of Patent: Jul. 4, 2006

(54) TERMINAL, METHOD AND COMPUTER PROGRAM PRODUCT FOR PRODUCING A USER PERCEPTIBLE OUTPUT UPON REACHING A PREDEFINED THRESHOLD

(75) Inventor: George Bernhart, Trophy Club, TX (US)

(73) Assignee: Nokia Corporation, Espoo (FI)

( * ) Notice: Subject to any disclaimer, the term of this patent is extended or adjusted under 35 U.S.C. 154(b) by 237 days.

(21) Appl. No.: 10/716,236

(22) Filed: Nov. 18, 2003

(65) Prior Publication Data
US 2005/0107065 A1    May 19, 2005

(51) Int. Cl.
*H04M 11/00* (2006.01)
(52) U.S. Cl. .................. 455/407; 455/405; 455/418; 370/328; 370/338
(58) Field of Classification Search ............... 455/418, 455/405, 407; 370/328, 338
See application file for complete search history.

(56) References Cited

U.S. PATENT DOCUMENTS

| | | | |
|---|---|---|---|
| 6,018,655 A * | 1/2000 | Bartle et al. ............... 455/421 |
| 2002/0016157 A1 * | 2/2002 | Arsenault et al. ........ 455/226.3 |
| 2004/0127198 A1 * | 7/2004 | Roskind et al. .......... 455/412.2 |
| 2004/0127206 A1 * | 7/2004 | Van Bosch et al. ......... 455/418 |
| 2005/0075992 A1 * | 4/2005 | Gavan et al. ................ 706/10 |

* cited by examiner

*Primary Examiner*—Danh Cong Le
(74) *Attorney, Agent, or Firm*—Alston & Bird LLP (57) ABSTRACT

A terminal adapted to communicate via a communications system includes a transmitter and a receiver for transmitting and receiving a plurality of different communications signals, respectively. The terminal includes a controller which is capable of counting service increments, such as time and/or data increments, and controlling the operation of an associated user interface to produce a user perceptible output, such as an audible tone, when the count reaches the threshold. As such, the user interface can inform the user of the terminal when a threshold for data or time usage has been reached and/or surpassed.

20 Claims, 5 Drawing Sheets

TERMINAL, METHOD AND COMPUTER PROGRAM PRODUCT FOR PRODUCING A USER PERCEPTIBLE OUTPUT UPON REACHING A PREDEFINED THRESHOLD

FIELD OF THE INVENTION

The present invention relates generally to mobile terminals such as mobile telephones and, more particularly, relates to a mobile terminal, method, and computer program product for counting service increments on a communications network and providing audible tones to alert a mobile terminal user that a user-defined time or data threshold has been reached or that a user-specified number of service increments, such as minutes or kilobytes, has been used in a given communications session.

BACKGROUND OF THE INVENTION

The deployment of advanced high bit-rate mobile networks has opened up new opportunities for delivering a host of services in a way that was not possible with earlier second generation wireless networks. Recent systems including third generation (3G) systems, such as those specified for use with the Global System for Mobile Communications (GSM) wireless standard, enable the delivery of new digital services such as video calls and the playback of multimedia applications that are comprised of audio and video clips. Modem mobile terminals have the ability to receive these services on a number of different communications networks and each type of network can be characterized by its own service increments (such as minutes of airtime or kilobytes (kB) of data) for which the user is charged service fees.

3G Mobile terminals communicate using various communications networks, such as Wireless Local Area Networks (WLAN), radio-frequency links (such as General Packet Radio Service (GPRS)), local infra-red links (such as IrDA), and other proprietary links (such as Bluetooth). In addition some mobile terminals have the capability to use these various networks concurrently to widen the total available bandwidth spectrum. For some communications networks, such as the radio-frequency-based general packet radio service (GPRS), service charges are measured in increments that are not readily ascertainable by a mobile terminal user. For instance, a user utilizing a GPRS communications network for a communications session, may be charged for service based on the number of kilobytes (kB) transferred.

Conventional terminals, such as mobile telephones, generally include a log feature capable of counting minutes spent on a given network connection. In conventional terminals, this time log is visually represented to the user on a display as, for instance, a total minutes counter. However, a user must remember to check the time log if the user wants to monitor his or her usage. Not only is it sometimes disruptive to check the time log, but a user may forget or simply ignore the time log if the user becomes otherwise preoccupied. For example, as mobile terminal users are engaged in gaming sessions or data transfers utilizing the communications network, the users may not check the usage log since a visual interruption on the terminal display would disrupt game play or viewing of video data. Moreover, in instances in which a user has subscribed to a service for a predefined number of minutes or a predefined dollar amount, the user may not be forewarned that the service is about to terminate. Additionally, while conventional time logs are generally expressed in terms of time, it would oftentimes be desirable to monitor other parameters associated with the usage, such as the cost of the current session or the amount of data, such as in terms of kB, that has been transferred. Furthermore, there exists a need to convey cost information to the user as the user is utilizing a communications network so that the user does not unwittingly spend more in communications service costs than expected during a given communications session.

SUMMARY OF THE INVENTION

In light of the foregoing background, the present invention provides an improved terminal, method and computer program product for alerting the terminal user, typically by means of an audible tone, as to when a user-defined threshold of cost or service increments for a given communications network has been reached. The terminal, method and computer program product of the present invention allow a user to specify and input a threshold number of service increments (such as minutes or kilobytes) using, for instance, a keypad, such that a controller within the mobile terminal compares the threshold number of service increments to the number of service increments that have been expended. The controller, upon determining when the number of service increments reaches the threshold, directs the user interface of the terminal to produce a user perceptible output, such as an audible tone, thereby alerting the terminal user that the threshold number of service increments has been reached during a given communications session. In addition, the controller may also be configured to convert at least one of the threshold input and the count of the number of service increments that have been expended into a common unit of measurement to permit a ready comparison. For instance, the terminal user may input a threshold dollar amount, which the controller could convert to an equivalent number of kilobytes, such that when the resulting converted number of kilobytes was expended during a given communications session, the controller would direct the user interface to produce an audible tone to alert the user that a dollar amount corresponding to the counted number of kilobytes (and the converted threshold dollar amount) had been surpassed. As such, a user of the terminal may be kept informed of the costs associated with a given communications session, thus preventing the need to interrupt, for instance, an ongoing gaming session occurring via a GPRS link, with a visual cue on the terminal display.

According to one embodiment of the present invention, a terminal adapted to communicate via a plurality of different mobile communications system is provided. The terminal includes a transmitter and a receiver for transmitting and receiving communications signals, respectively. The terminal also includes a user interface that may be capable of receiving at least one threshold input of service increments from a terminal user and is capable of producing a user perceptible output, such as an audible tone. Also, to store the user threshold input, the terminal of the present embodiment may include a memory. To control the operation of the user interface, the terminal also includes a controller. In this regard, the controller is capable of counting service increments (for example kilobytes in a GPRS session, or minutes on a digital audio or video connection) utilized in a given communications session, and of generating a result (which may be the actual count), which the controller may repeatedly compare to the threshold. When the controller detects that the result generated by the controller reaches the threshold, such as by being equal to the threshold, the controller directs the user interface to produce a user perceptible output, such as an audible tone.

In one embodiment, the controller can be adapted to convert either or both of the threshold and the result generated by the controller, i.e., the count, into a common unit of measurement that are more readily comparable. For instance, the controller may convert a user threshold input in currency units (corresponding to the maximum desired cost of a given communications session) into kilobytes or minutes, which correspond to the measurable service increments for the current communications system.

In yet another embodiment of the present invention, the user interface can be adapted to receive a plurality of thresholds and can correspondingly produce a plurality of different outputs corresponding to the count of the service increments reaching different ones of the thresholds. In this embodiment, the controller is capable of directing the user interface to produce a different audible tone as the service increment counter output matches each of the plurality of thresholds. Thus, the user of the terminal may utilize this embodiment to specify, for instance, higher-pitched audible tones, to be emitted by the user interface as higher currency thresholds of a set increment are surpassed by the service increment count.

According to other aspects of the present invention, a method and computer program product are provided for providing a user perceptible output, such as an audible tone, when the count of service increments that have been utilized reaches a preset threshold. The present invention therefore provides an improved terminal, method and computer program product that allows a user of the terminal to be easily and conveniently alerted as to the costs and services being incurred during a given communications session on the terminal. Furthermore, the alert may be presented in an audible format so that the terminal visual display is not interrupted with a visual cue if, for instance, the user is in the midst of an ongoing game session with another user on the communications network. In addition, the terminal, method and computer program product of the present invention allow the terminal user to preset threshold costs for communications sessions such that the user is alerted audibly when those threshold costs have been reached or surpassed.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE PREFERRED EMBODIMENT(S)

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
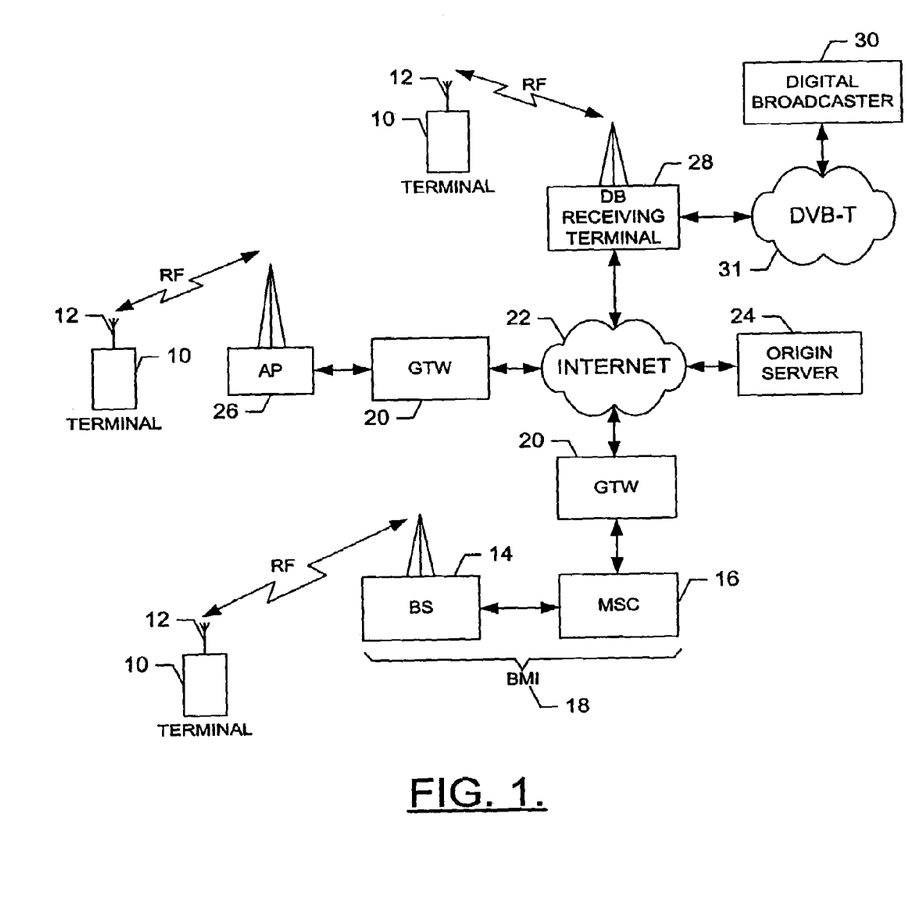
FIG. 1 is a schematic block diagram of a wireless communications system according to one embodiment of the present invention including a cellular network and a data network to which a terminal is bi-directionally coupled through wireless RF links.

Referring to FIG. 1, an illustration of one type of terminal and system that would benefit from the present invention is provided. The terminal, method and computer program product of embodiments of the present invention will be primarily described in conjunction with mobile communications applications. It should be understood, however, that the terminal, method and computer program product of embodiments of the present invention can be utilized in conjunction with a variety of other applications, both in the mobile communications industries and outside of the mobile communications industries. For example, the terminal, method and computer program product of embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI) 18. In operation, the MSC is capable of routing calls and messages to and from the terminal when the terminal is making and receiving calls. The MSC also provides a connection to landline trunks when the terminal is involved in a call. Further, the MSC can be coupled to a server gateway (GTW) 20.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 20, and the GTW is coupled to a WAN, such as the Internet 22. In turn, devices such as processing elements (e.g., personal computers, server computers or the like) can be coupled to the terminal 10 via the Internet. For example, as explained below, the processing elements can include one or more processing elements associated with an origin server 24 or the like, as illustrated in FIG. 1.

In addition to, or in lieu of, being coupled to the BS 14, the terminal 10 may be coupled to one or more wireless access points (APs) 26. In turn, the APs may be coupled to the Internet 22. Like with the MSC 16, the APs can be directly coupled to the Internet. In one advantageous embodiment, however, the APs are indirectly coupled to the Internet via a GTW 20. As will be appreciated, by directly or indirectly connecting the terminals and the origin server 24, as well as any of a number of other devices, to the Internet, the terminals can communicate with one another, the origin server, etc., to thereby carry out various functions of the terminal, such as to transmit data, content or the like to, and/or receive content, data or the like from, the origin server. As used herein, the terms "data," "content," "information" and similar terms may be used to interchangeably to refer to data capable of being transmitted, received and/or stored in accordance with embodiments of the present invention. Thus, use of any such terms should not be taken to limit the spirit and scope of the present invention.

The terminal 10 can additionally, or alternatively, be coupled to a digital broadcast (DB) receiving terminal 28. In turn, the digital broadcast receiving terminal can be coupled to a digital broadcaster 30 via a digital broadcast network, such as a terrestrial digital video broadcasting (DVB-T) network 31. In this regard, the digital broadcaster can comprise a DVB-T transmitter, and the digital broadcast receiving terminal can comprise a DVB-T receiver in the form of a set top box. The terminal can be directly coupled to the digital broadcast receiving terminal, such as via a personal area network (PAN). In one advantageous embodiment, however, the terminal can additionally or alternatively be indirectly coupled to the digital broadcast receiving terminal via the Internet 22. As will be appreciated, by directly or indirectly connecting the terminals and the digital broadcast receiving terminal, the terminals can receive content, such as content for one or more television, radio and/or data channels, from the digital broadcaster.

Figure 2:
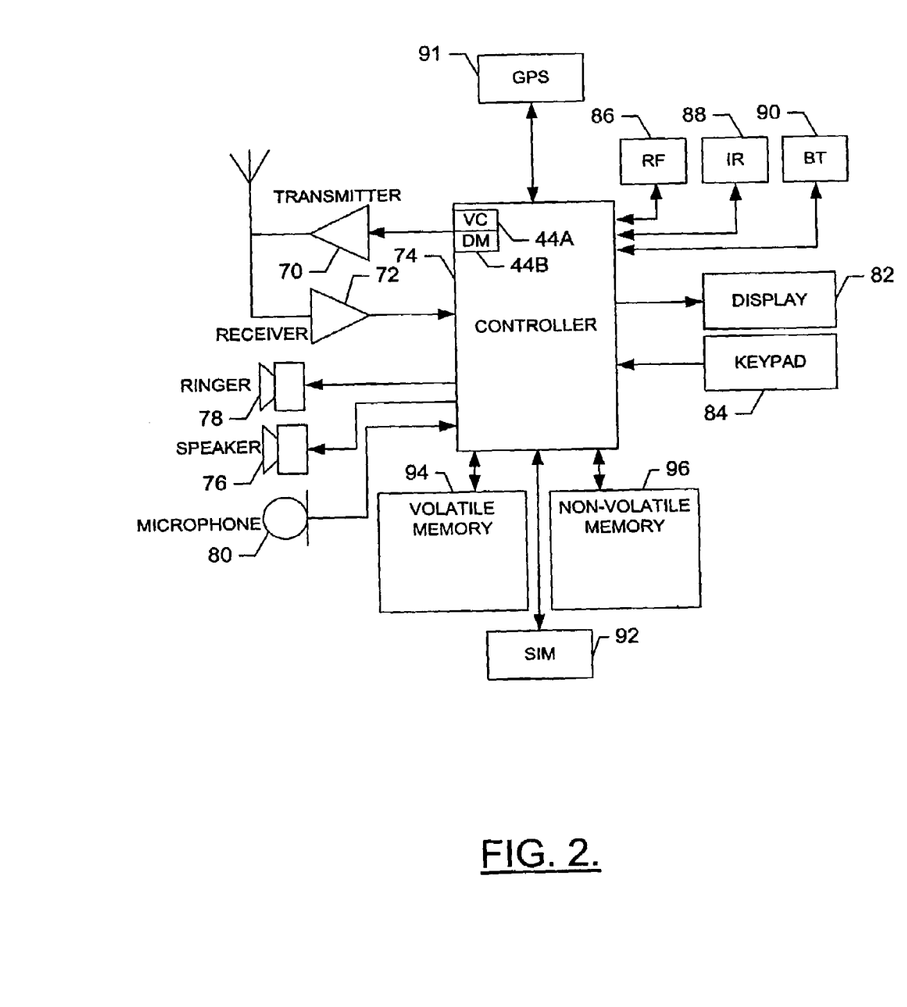
FIG. 2 is a schematic block diagram of a mobile station that may operate as a terminal, according to embodiments of the present invention.

FIG. 2 illustrates a functional diagram of a mobile station that may operate as a terminal 10, according to embodiments of the invention. It should be understood, that the mobile station illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), GPRS portable gaming devices, pagers, laptop computers and other types of voice and text communications systems, can readily employ the present invention.

The mobile station includes a transmitter 70, a receiver 72, and a controller 74 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) communication protocols or the like. For example, the mobile station may be capable of operating in accordance with 2G wireless communication protocols IS-136 (TDMA), GSM, and IS-95 (CDMA). The mobile station can further be capable of operating in accordance with any of a number of different digital broadcasting techniques, such as the DVB technique (e.g., DVB-T, ETSI Standard EN 300 744). Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 74 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 74A, and may include an internal data modem (DM) 74B. Further, the controller may include the functionally to operate one or more software applications, including the computer program product embodiments of the present invention, which may be stored in memory.

The mobile station also comprises a user interface including a conventional earphone or speaker 76, a ringer 78 for producing a plurality of audible tones, a microphone 80, a display 82, and a user input interface, all of which are coupled to the controller 74. The user input interface, which allows the mobile station to receive data, can comprise any of a number of devices allowing the mobile station to receive data, such as a keypad 84, a touch display (not shown) or other input device. In embodiments including a keypad, the keypad includes the conventional numeric (0–9) and related keys (#, *), and other keys used for operating the mobile station.

The mobile station can also include one or more means for sharing and/or obtaining data from electronic devices, such as another terminal 10, an origin server 24, an AP 26, a digital broadcast receiving terminal 28, a digital broadcaster 30 or the like, in accordance with any of a number of different wireline and/or wireless techniques. For example, the mobile station can include a radio frequency (RF) transceiver 86 and/or an infrared (IR) transceiver 88 such that the mobile station can share and/or obtain data in accordance with radio frequency (GPRS, for example) and/or infrared (IrDA, for example) techniques. Also, for example, the mobile station can include a Bluetooth (BT) transceiver 90 such that the mobile station can share and/or obtain data in accordance with Bluetooth transfer techniques. Although not shown, the mobile station may additionally or alternatively be capable of transmitting and/or receiving data from electronic devices according to a number of different wireline and/or wireless networking techniques, including LAN and/or WLAN techniques.

The mobile station can further include memory, such as a subscriber identity module (SIM) 92, a removable user identity module (R-UIM) or the like, which typically stores information elements related to a mobile subscriber. In addition to the SIM, the mobile station can include other memory. In this regard, like the digital broadcast receiving terminal 28 and the digital broadcaster 30, the mobile station can include volatile memory 94. Also, again like the digital broadcast receiving terminal and the digital broadcaster, the mobile station can include other non-volatile memory 96, which can be embedded and/or may be removable. For example, the other non-volatile memory that available from the SanDisk Corporation of Sunnyvale, Calif., or Lexar Media Inc. of Fremont, Calif.

The memories 92, 94, 96 can store any of a number of pieces of information, and data, used by the mobile station to implement the functions of the mobile station. For example, the memories can store an identifier, such as an international mobile equipment identification (IMEI) code, capable of uniquely identifying the mobile station, such as to the MSC 16. The memories can also store content, such as that received from an origin server 24 and/or a digital broadcast receiving terminal. Also, for example, the memories can also store user or host applications such as a conventional text viewer, audio player, video player, multimedia viewer or the like. Also as explained in more detail below, the memories can further store a threshold that may be input by the terminal user via, for instance, the keypad 84 or other user input interface.

As indicated in the background section, although conventional terminals are capable of controlling the terminal display 82 to visually represent a stored log of total minutes spent on a communications network, it is desirable to alert the terminal user via a user perceptible output, such as audible tones or a vibratory output, of when a threshold, typically defined in terms of cost, kilobytes and/or usage time, has been reached in a given communications session on a terminal sharing and/or obtaining data from electronic devices in accordance with any of a number of different wireline and/or wireless techniques.

As such, and in accordance with embodiments of the present invention, the controller 74 of the terminal 10 is capable of receiving a threshold. For example, the threshold may be input by way of a user input interface such as, for example, a keypad 84. The terminal 10 may store the user-defined threshold in the volatile memory 94 or non-volatile memory 96. During operation in which the terminal is transmitting and/or receiving signals via a communications system, the controller 74 is also capable of counting a plurality of service increments utilized by the terminal by monitoring, for instance, the transmitter 70, the receiver 72 and/or the transceivers 86, 88, 90 to determine the number of service increments utilized by the terminal 10 in a given communications session. The definition of a service increment may vary depending on the type of communications system being accessed by the terminal 10. For instance, in one embodiment of the instant invention, the controller 74 monitors the RF transceiver 86, in order to count kilobytes of data sent and received via a General Packet Radio Service (GPRS) communications system during a communications session.

During this ongoing session, the controller 74 is further capable of comparing the number of service increments that have been expended, as typically defined by the running count maintained by the controller, to the threshold stored in the memory 94, 96 of the terminal 10. Once the count of the service increments that have been expended reaches the threshold, the controller may create a user perceptible output. Typically, the controller creates the user perceptible output once the count of the service increments that have been expended equals the threshold. However, the controller may be designed such that the count of the service increments that have been expended is only considered to have reached the threshold once the count exceeds the threshold. Still further, the comparison of the count to the threshold also contemplates counting down from the threshold as the service increments are expended and generating the user perceptible output once the count reaches zero.

The controller 74 can direct that various types of user perceptible outputs be produced. In one embodiment, the controller directs the user interface to generate an audible tone, such as by directing the ringer 78 or other sound generation device to produce an audible tone when the count of the service increments that have been expended reaches the threshold. Alternatively, the controller could direct the user interface to create a vibratory motion, or to alter the backlighting of the display 82 or the be produced without departing from the spirit and scope of the present invention. Typically, however, the controller is designed to alert the user without overwriting the display 82 such that a user can continue to utilize the display as before.

In some embodiments, the count or other result generated by the controller 74 may have a different unit of measurement than the threshold. In these embodiments, the controller 74 is also capable of converting either or both of the threshold and the count of the service increments that have been expended into a common unit of measurement to facilitate a comparison therebetween. For example, the threshold may be input and stored in the memory 94, 96 as a currency or monetary amount and may be converted by the controller 74 into a unit of measurement that is readily comparable to the service increments utilized by a given communications system, such as kilobytes, in a GPRS system, for example. In order to convert a threshold value expressed in currency units, the controller 74 may access the threshold in currency units that is stored in memory 94, 96, as well as information on the cost per kilobyte or cost per minute for communication from an origin server 24 and/or a digital broadcast receiving terminal to the terminal 10. In doing so, the controller is capable of converting the currency threshold into a service increment unit such as kilobytes or minutes so as to be easily comparable to the count of service increments generated by the controller 74.

The terminal 10 of the present invention may store a plurality of different thresholds, each of which may be input by the user via the keypad 84 and stored either in the volatile memory 94 or non-volatile memory 96 of the terminal 10. The controller 74 may then count the service increments and direct that a user perceptible output, such as an audible tone, be generated when the counted number of service increments is compared to, and found to have reached, each of the various threshold inputs.

The terminal 10 of this embodiment may generate different types of outputs as different ones of the thresholds are reached. For example, the terminal may include a ringer 78 or other sound generation device that is capable of producing a plurality of different audible tones. Thus, the user may choose, via the keypad 84, or other user input interface, a plurality of different audible tones corresponding to respective ones of the plurality of thresholds. In this embodiment, the controller 74 is capable of directing the ringer 78 or other sound generation device to produce each of the different audible tones as the controller 74 counts a number of service increments that at least equal to a respective threshold stored in volatile memory 94 or non-volatile memory 96. The user may choose, for instance, to have the ringer 78 produce successively higher-pitched audible tones as the count of service increments that have been expended reaches different ones of the thresholds during a given communications session. Thus the user of the terminal can be audibly alerted of the approximate cost of a given communications session without having visual cues appear on the display 82 of the terminal 10, which would disrupt the viewing of visual data streaming and/or gaming sessions.

Figure 3:
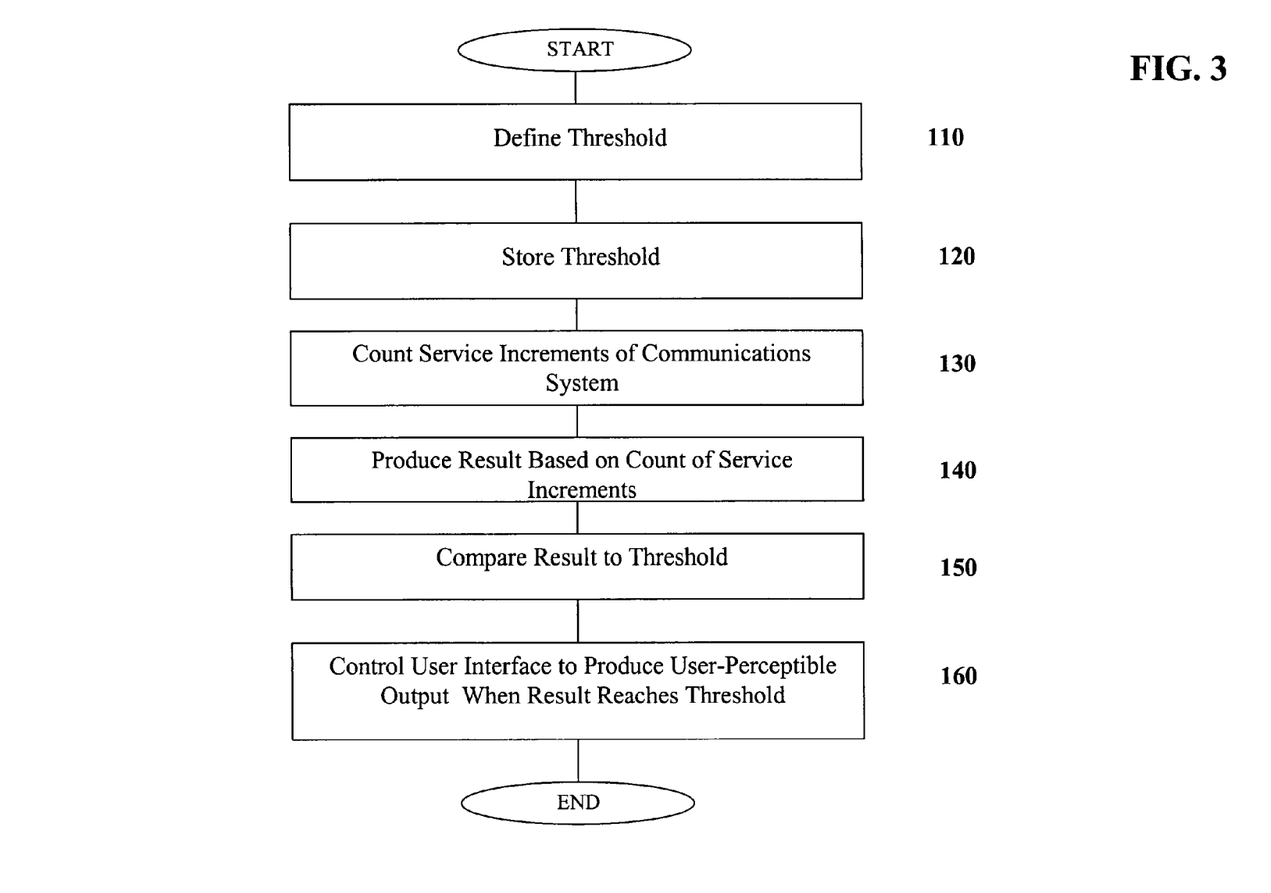
FIG. 3 is a flowchart illustrating various steps in a method and computer program product of one embodiment of the present invention for operating a mobile station in the context of receiving and storing a user-defined threshold input and controlling the user interface to produce an audible tone when the threshold number of service increments is counted during a given communications session.

According to one embodiment of the present invention, as illustrated in the block diagram of FIG. 3, a method and computer program product for alerting a user upon reaching a threshold during a given communications session initially defines the threshold, such as by receiving a threshold input from the user. The threshold may then be stored as shown in block 120. Next, block 130 depicts the step of counting the service increments utilized by the terminal 10, and block 140 shows the generation of a result based on, and typically equaling, the count. Finally, block 150 shows the method step wherein the result is compared to the threshold, followed by block 160, which depicts the step of controlling the user interface to produce a user perceptible output, such as an audible tone, when the result is determined to have reached the threshold. These method steps may be performed by the terminal 10 and, most typically by the controller 74, operating under control of a computer program product.

For example, a user may input a threshold expressed in kilobytes of data for a given GPRS gaming session such that the terminal 10 will emit an audible tone when the controller 74 has counted the number of kilobytes expressed in the threshold during that session. Thus, the user will not be visually interrupted during the gaming session, but will nonetheless be alerted as to when the data transfer threshold has been surpassed.

Figure 4:
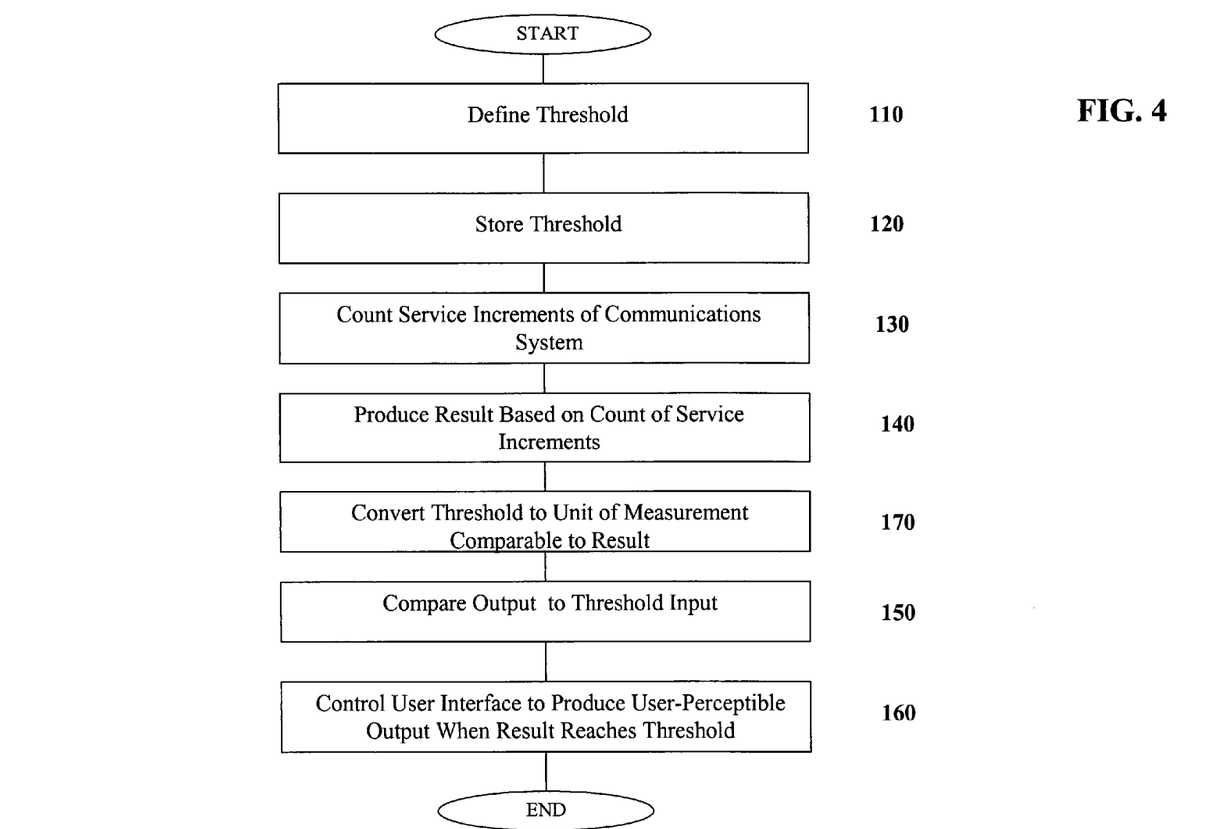
FIG. 4 is a flowchart illustrating various steps in a method and computer program product of one embodiment of the present invention for operating a mobile station as in FIG. 3 including a further converting step for converting a user-defined threshold input into a unit of measurement that is readily comparable to the counted service increments of the communications system.

According to a second embodiment of the present invention, FIG. 4 illustrates, in a block diagram, a method and a computer program product for determining if a threshold has been met in terms of the service increments utilized during a current session in which six of the steps consist of the process described in FIG. 3 above, see blocks 110, 120, 130, 140, 150, and 160. The embodiment of FIG. 4 includes additional step shown in block 170 which may prior to the comparison step of block 150. Block 170 illustrates the additional step of converting the threshold into a unit of measurement that is comparable to or in common with the unit of measurement of the service increments counted in the counting step of block 130. Alternatively, the count generated by the controller could be converted to have the same unit of measurement as the threshold, or both the count and the threshold can be converted to a common unit of measurement that is different than the original unit of measurement of either the count or the threshold. In any event, it is advantageous for both the count or other result generated by the controller 74 and the threshold to be represented in a common unit of measurement during the comparison process.

For instance, for a threshold provided in a currency unit, such as dollars, the controller 74 may be capable of determining a dollars-per-minute conversion factor for the given terminal and communications system in order to convert a dollar amount threshold into an equivalent number of minutes such that the threshold in terms of minutes is directly comparable to the minutes-based service increments of, for instance, a digital broadcast (DB) communications link.

Figure 5:
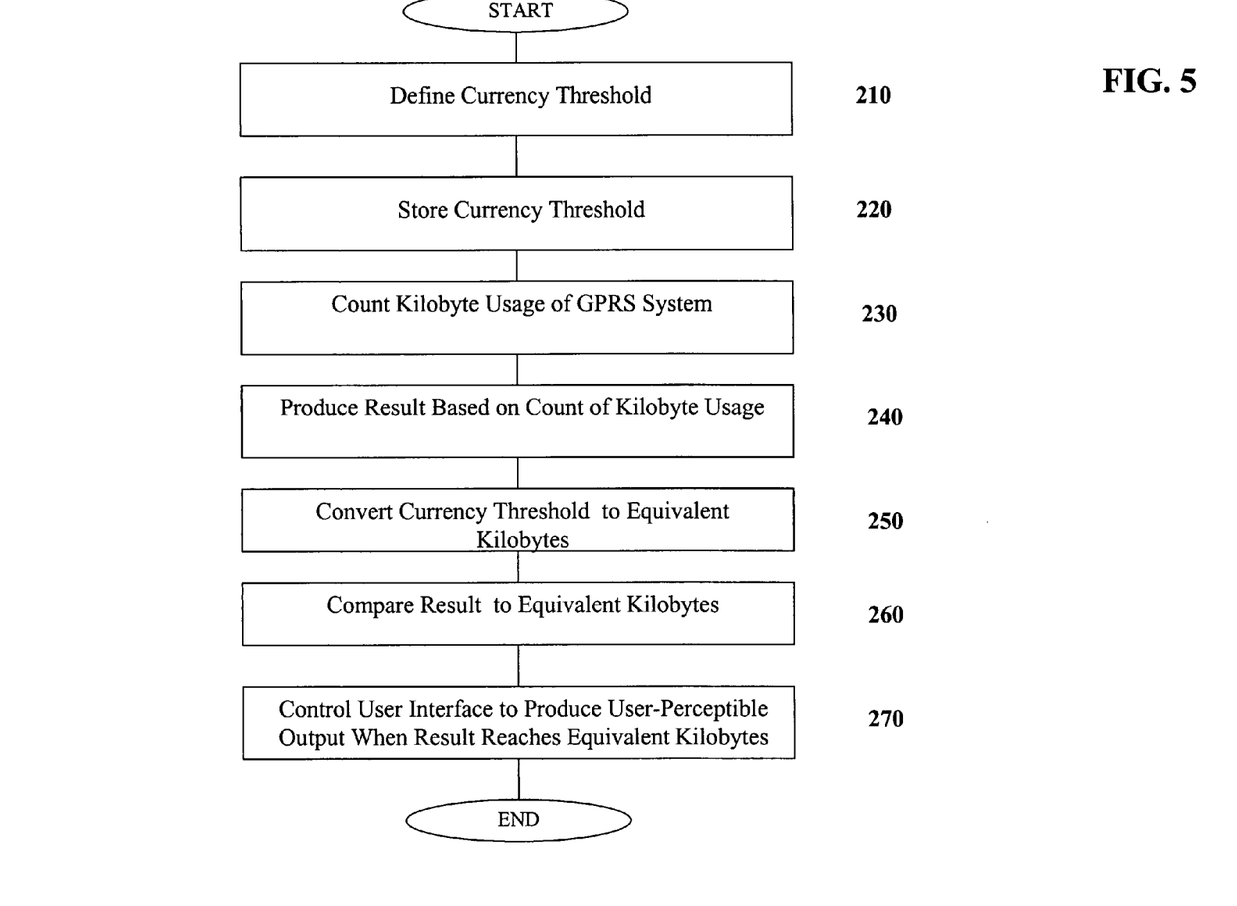
FIG. 5 is a flowchart illustrating various steps in a method and computer program product for operating a mobile station according to one advantageous embodiment of the present invention, in the context of receiving and storing a user-defined currency input and controlling the user interface to convert the currency input to an equivalent number of kilobytes and produce an audible tone when a counted number of kilobytes is equal to the equivalent number of kilobytes.

According to one advantageous embodiment of the present invention, FIG. 5 illustrates, in a block diagram, a method and computer program product for alerting the user of a GPRS terminal, such as by means of an audible alert, when a threshold dollar amount, corresponding to a counted number of kilobyte service increments, has been reached in a given GPRS data-transfer session. The advantageous method of FIG. 5 is similar to the method illustrated in FIG. 4. The method shown in FIG. 5, however, is specifically adapted for counting data service increments on a GPRS communications system and comparing the count to a threshold expressed in currency units. The first step of this embodiment is illustrated in block 210, wherein a currency input is received from a user. Second, block 220 depicts the storage of the currency input. Block 230 depicts the step of counting the data service increments (in kilobytes) used in a GPRS communications link, and block 240 further shows the step of producing an result based on the kilobyte count from block 230. Next, block 250 shows a conversion step, wherein the currency input stored in block 220 is converted from a currency unit to an equivalent number of kilobyte service increments. Finally, block 260 shows the comparison of the result from block 240 to the converted equivalent kilobytes from block 250. The final step in the method, depicted in block 270, occurs as the user interface of the terminal 10 is directed to produce an alert, such as an audible tone, when the result reaches the threshold, such as by being equal to the equivalent number of counted kilobytes.

The steps of the advantageous method depicted in FIG. 5 may also be implemented by a computer program product, such that in the step shown in block 210 the user enters a currency input via a keypad 84, which the computer program product receives and transfers to memory 94, 96 for long or short-term storage as depicted in block 220. Further the computer program product may include a software counter embedded in the controller 74 that monitors the RF transceiver 86 to count the kilobyte service increments used by the GPRS terminal 10 during a given communications session as shown in block 230. The computer program product may then produce a kilobyte result, typically in terms of a count of the kilobyte service increments that have been utilized, as in block 240. The controller may further monitor the RF transceiver 86 to determine the kilobytes-per-currency unit equivalent such that the controller may convert the currency input stored in memory 94, 96, into an equivalent number of threshold kilobytes as depicted in block 250. Then, utilizing the converted kilobyte threshold from block 250, the controller may compare the kilobyte threshold amount to the counted number of kilobytes output from block 240, and direct the terminal ringer 78 or other sound generation device to produce an audible tone when the output kilobytes reaches the threshold, such as by being equal to the converted number of threshold kilobytes, as depicted in block 270.

For example the method and computer program product of the advantageous embodiment shown in FIG. 5 may be utilized on a GPRS terminal adapted for network game play and data transfer wherein multiple terminals share data via a GPRS link and wherein the service increments of the GPRS link are expressed in kilobytes. A terminal user may define a threshold dollar amount and input this amount as a currency input using the keypad 84 at the outset of the gaming or communications session so as to be alerted when the specified currency amount has been surpassed in the specified session. Using the method of FIG. 5, the user need not be aware of the number of kilobytes used in a session, nor the conversion factor of kilobytes per dollar, for instance, in order to be alerted as to when a certain dollar, or other currency amount, has been spent in a given session. In addition, the terminal user is not visually interrupted during a GPRS gaming session with a visual cue on the terminal display 82, but is instead audibly alerted by way of a tone produced on the terminal ringer 78 as to when the user-defined threshold currency amount has been spent.

According to alternate embodiments of the present method and computer program product, the controller 74 may recognize a plurality of thresholds. As such, the controller 74 may direct the ringer 78 or other sound generation device of the terminal 10 to produce an audible tone as each of the successive threshold inputs is surpassed during a given communications session. The ringer 78 or other sound generation device may be adapted to produce a plurality of different audible tones, which the user may choose to assign to different ones of the thresholds. The user may, for instance, choose a first audible tone to be produced as a five dollar threshold is reached during a GPRS gaming session, and a second audible tone (with for instance, a higher pitch), to be produced as a subsequent ten dollar threshold is reached during the same GPRS session. In this manner, the user is repeatedly updated as to the cost of the GPRS session without being interrupted with information that is presented visually on the terminal display 82.

According to one aspect of the present invention, portions of the terminal 10 of the present invention generally operate under control of a computer program product. The computer program product for performing the methods of embodiments of the present invention includes a computer-readable storage medium, such as the non-volatile storage medium 96, and computer-readable program code portions, such as a series of computer instructions, embodied in the computer-readable storage medium.

In this regard, FIGS. 3–5 are functional block diagrams and flowcharts of methods and program products according to the invention. It will be understood that each block or step of the block diagram and flowcharts, and combinations of blocks in the block diagram and flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the block diagram and flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the block diagram and flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the block diagram and flowcharts.

Accordingly, blocks or steps of the block diagram and flowcharts support combinations of means for performing the specified functions, combinations of steps for performing the specified functions and program instruction means for performing the specified functions. It will also be understood that each block or step of the block diagram and flowcharts, and combinations of blocks or steps in the block diagram and flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A terminal adapted to communicate via at least one communications system in a plurality of service increments, wherein the terminal comprises:
   a transmitter and a receiver for transmitting and receiving signals, respectively, via the at least one communications system;
   a user interface capable of producing a user perceptible output and receiving at least one threshold; and
   a controller capable of counting the plurality of service increments utilized by the terminal, producing a result based on counting the plurality of service increments, converting at least one of the threshold and the result to a common unit of measurement, comparing the result to at least one threshold, and directing the user interface to produce the user perceptible output when the result is reaches the at least one threshold.

2. A terminal according to claim 1, wherein the user interface is further capable of receiving a plurality of thresholds and wherein the controller is further capable of comparing the result to the plurality of thresholds and directing the user interface to produce a user perceptible output when the result reaches at least one of the plurality thresholds.

3. A terminal according to claim 2 wherein the user interface is further capable of producing an audible tone as the user perceptible output.

4. A terminal according to claim 3, wherein the user interface is further capable of producing a plurality of different audible tones and wherein the controller is further capable of directing the user interface to produce a different audible tone when the output reaches each of the respective thresholds.

5. A terminal according to claim 1, wherein the user interface is further capable of receiving a plurality of thresholds and wherein the controller is further capable of converting at least one of the thresholds and the result to a common unit of measurement comparing the result to the plurality of thresholds following the conversion and directing the user interface to produce the user perceptible output when the result reach at least one of the plurality of threshold.

6. A terminal according to claim 1, wherein the plurality of service increments is expressed in a unit of measurement selected from the group consisting of:
   kilobytes;
   units of time; and
   units of currency.

7. A terminal adapted to communicate via a General Packet Radio Service (GPRS) communications system, the GPRS communications system measuring service in terms of kilobytes, wherein the terminal comprises:
   a transmitter and a receiver for transmitting and receiving signals, respectively, via the GPRS communications system;
   a user interface capable of receiving at least one currency threshold and capable of producing a user perceptible output; and
   a controller capable of counting the plurality of kilobytes transferred via the GPRS communications system, producing a result based on counting the plurality of kilobytes, converting at least one of the result and the currency threshold such that the result and the currency threshold share a common unit of measurement, and directing the user interface to produce the user perceptible output when the result reaches the currency threshold following the conversion of at least one of the result and the currency threshold to a common unit of measurement.

8. A method of audibly alerting a user of a terminal upon reaching a threshold during a given communications session, wherein the terminal is adapted to communicate via at least one communications system in a plurality of service increments, said method comprising:
   transmitting and receiving signals via the at least one communications system;
   counting the plurality of service increments utilized by the terminal;
   producing a result based on counting the plurality of service increments;
   converting at least one of the threshold and the result to a common unit of measurement;
   comparing the result to the at least one threshold; and
   producing a user perceptible output when the result reaches the at least one threshold.

9. A method according to claim 8, further comprising receiving a plurality of thresholds, wherein the comparing step further comprises comparing the result to the plurality of thresholds, and wherein the producing step further comprises producing the user perceptible output when the result reaches one of the plurality of thresholds.

10. A method according to claim 9 wherein producing the user perceptible output comprises producing an audible tone.

11. A method according to claim 10, wherein the producing step further comprises producing a different audible tone when the result reaches each of the respective thresholds.

12. A method according to claim 9, further comprising receiving a plurality of thresholds, wherein the converting step further comprises converting at least one of the plurality of thresholds and the result to a common unit measurement, wherein the comparing step further comprises comparing the result to the plurality of threshold following the conversion, and wherein the producing step further comprises producing the user perceptible output when the reaches at least one the plurality of thresholds.

13. A method according to claim 8, wherein the plurality of service increments is expressed in a unit of measurement selected from the group consisting of:
   kilobytes;
   units of time; and
   units of currency.

14. A method of alerting a user upon reaching a level of expense during a given communications session, on a terminal adapted to communicate via a General Packet Radio Service (GPRS) communications system in terms of kilobytes, said method comprising:
   transmitting and receiving signals on the GPRS communications system;
   receiving a currency threshold;
   counting the plurality of kilobytes transferred via the GPRS communications system;
   producing a result based on counting the plurality of kilobytes;
   converting at least one of the currency threshold and the result to a common unit of measurement; and
   producing a user perceptible output when the result reaches the currency threshold following the conversion of at least one of the result and the currency threshold to a common unit of measurement.

15. A computer program product for alerting a user of a terminal upon reaching a threshold during a given communications session, wherein the terminal is adapted to communicate via at least one communications system in a plurality of service increments, the computer program product comprising a computer-readable storage medium having computer-readable program code portions stored therein, the computer-readable program code portions comprising:
   a first executable portion for counting the plurality of service increments utilized by the terminal;
   a second executable portion for producing a result based on counting the plurality of service increments;
   a third executable portion for converting at least one of the threshold and the result to a common unit of measurement;
   a fourth executable portion for comparing the result to at least one threshold; and
   a fifth executable portion for producing a user perceptible output when the result reaches the at least one threshold.

16. A computer program product according to claim 15, further comprising a sixth executable portion that is adapted to receive a plurality of thresholds, wherein the third executable portion is adapted to compare the result to the plurality of thresholds, and wherein the fourth executable portion is adapted to produce the user perceptible output when the result reaches one of the plurality of thresholds.

17. A computer program product according to claim 16 wherein the fourth executable portion is adapted to produce an audible tone as the user perceptible output.

18. A computer program product according to claim 17, wherein the fourth executable portion is adapted to produce different audible tones when the result reaches each of the respective thresholds.

19. A computer program product according to claim 17, further comprising a sixth executable portion that is adapted to receive a plurality of thresholds, wherein the fifth executable portion is adapted to convert at least one of the plurality of thresholds and the result to a common unit of measurement, wherein the third executable portion is adapted to compare the result of the plurality of threshold, and wherein the fourth executable portion is adapted to produce the user perceptible output when the result reaches one of the plurality of thresholds.

20. A computer program product according to claim 17, wherein the first executable portion is adapted to count the plurality of service increments that are expressed in a unit of measurement selected from the group consisting of:
   kilobytes;
   units of time; and
   units of currency.

* * * * *